UNITED STATES PATENT OFFICE.

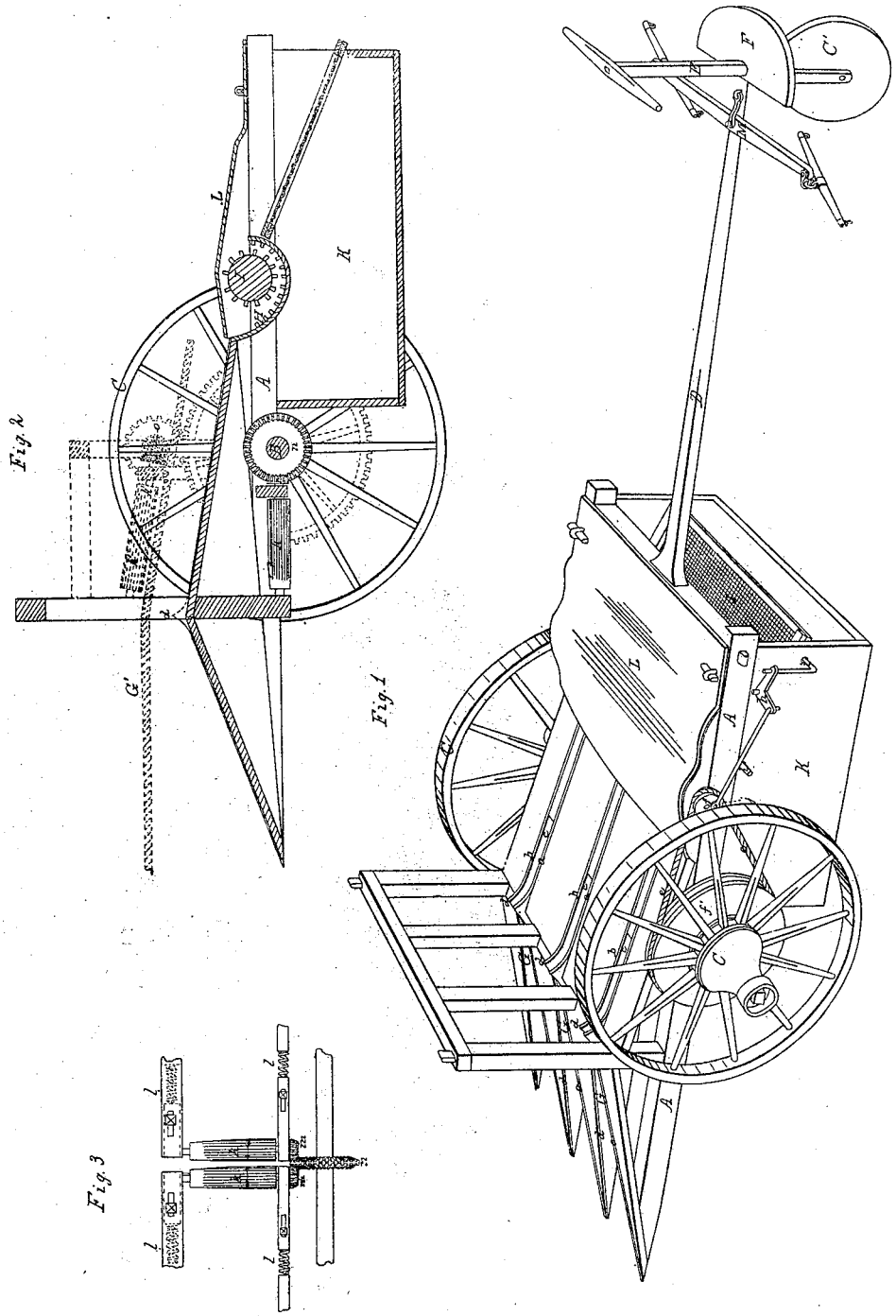

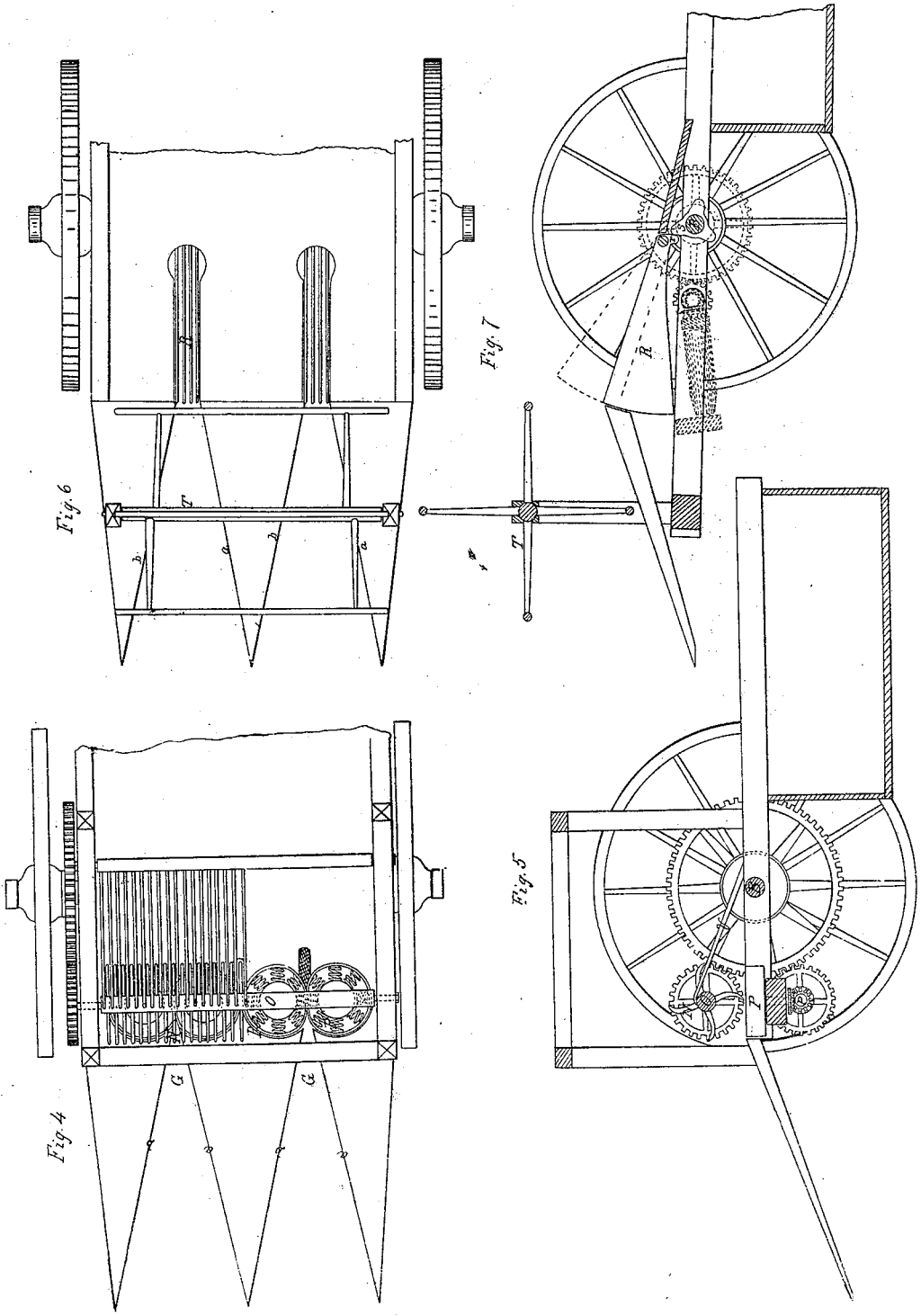

WM. WATSON, OF CHICAGO, ILLINOIS.

MAIZE-HARVESTER.

Specification forming part of Letters Patent No. 7,725, dated October 15, 1850.

*To all whom it may concern:*

Be it known that I, WILLIAM WATSON, of Chicago, in the county of Cook and State of Illinois, have invented a new and useful Method of Harvesting Indian Corn, of which the following is a full, clear, and exact description, reference being had to the accompanying drawings, which form part of this specification, and in which—

Figure 1 represents a view in perspective of one of my corn-gatherers. Fig. 2 is a vertical longitudinal section of the same. Fig. 3 is a plan of a fragment of the same, and Figs. 4, 5, 6, and 7 are views of various modified machines constructed upon the principle invented by me.

My invention consists, first, in a new method of gathering the ears of Indian corn from the standing stalks by means of a fork which is mounted upon a carriage and is advanced forward by horse or other power against the standing stalks, beneath the lowermost ears. As the fork is advanced the stalks are received between the prongs, which, near their junction, are sufficiently close to each other to retain the ears of corn, while the stalks, being held to the ground by their roots, drag between the prongs and remain upon the field.

The second part of my invention, which is subsidiary to the first, consists in adapting to a carriage on which one or more gathering-forks are mounted an apparatus, by means of which the gathered ears are husked and shelled.

I have devised several machines for carrying my invention into practice. These vary considerably from each other in the form and construction of their parts, but all operate upon a common principle. Several of these machines are represented in the accompanying drawings, and are described in this specification, which also sets forth some of the modifications of which they are susceptible with sufficient clearness to enable a skillful mechanic to construct them.

In the corn-gatherer represented by Figs. 1, 2, and 3 the frame A of the machine is hung upon an axle, B, to which a pair of wheels, C, are fitted. One of these is secured to the axle, so that as the machine is moved the axle is caused to revolve.

A tongue, D, is projected from the back part of the frame, its hinder end being supported upon a wheel, C′, which is pivoted to an upright standard, E. The latter passes through a platform, F, secured to the hinder end of the tongue, and is fitted at its upper extremity with a T-handle, by means of which the wheel can be turned to direct the machine either to the right or left, as may be required.

Three gathering-forks, G, are mounted upon the frame A. These each consist of two prongs, $a\ b$, which project beyond the front of the frame. The pair of prongs composing each fork are parallel to each other for a short distance from their junction, and thence diverge until the adjacent prongs of two adjoining forks meet each other. The space between the parallel portions of the prongs is narrow, thus constituting a slot, $c$, sufficiently wide to allow the stalks of corn to pass between the faces of the prongs, but too narrow to allow the passage of ears. The opposite faces of the prongs are lined with metal. Their upper edges incline downward from the point $d$, where they begin to diverge, to their points. Those portions of the upper edges of the prongs which are behind the point where they begin to diverge are sloped off toward the back of the machine. The hinder inclined edges of these prongs terminate at the front edges of a toothed concave, H, which is situated behind the axle of the running wheels. The toothed cylinder I, which acts with this concave, crosses the machine. Its shaft is supported in suitable boxes on the frame, and it is driven from the axle by a belt, $e$, which encircles belt-pulleys $f\ f'$, secured to the axle and to the cylinder-shaft.

Immediately behind the concave H is a shaking riddle, J. This is inclined downward from the concave, and is supported by rods $i$, which pass transversely through the sides of the frame. One extremity of one of these rods is connected with a belt-crank, $h$, which is also connected with a pin, $j$, projected from the outer face of the belt-pulley on the cylinder-shaft, so that as the latter revolves the riddle receives a reciprocating motion. In most instances it is expedient to place an inclined grating above the riddle. This retains upon it the larger pieces of the cobs and husks, while the finer, with the grain, pass between the bars of the grating and fall upon the riddle. The hinder edge of the riddle projects over the hinder part of the machine, and the whole space beneath the riddle and the concave is boxed in to form a bin, K, in which the shelled corn is collected.

Immediately beneath the narrow slots are the spring-rollers $k$. These are parallel in direction with the slots and extend their whole length. Their journals are supported in boxes, which are constructed to slide from or toward each other in slots. These boxes are fitted with springs $l$, which tend to keep the barrels of the rollers close together, and which yield to admit the stalks between the rollers. The front extremities of the barrels of these rollers are turned off to allow the stalks to enter between them with greater facility, and their barrels are fluted to enable them the better to seize and hold the cornstalks. The hinder journal of each roller is protruded through its box, and is fitted with a beveled pinion, $m$. The two beveled pinions of each pair of rolls engage with the opposite teeth of a double-beveled wheel, $n$, which is secured to the axle on which the frame is hung. Hence, as the axle revolves the rollers are forced to turn with equal velocities in the directions indicated by the arrows in Fig. 3.

The shelling apparatus is protected by a cover, L, and a set of whiffletrees, M, are pivoted to the hinder extremity of the tongue.

The machine may be directed by an attendant, who stands upon the platform F, at the hinder end of the pole, where he drives the team, and at the same time moves the wheel C', by means of the standard E, to direct the slots between the prongs of the gathering-forks along the center lines of the hills or rows of corn. As the machine advances the stalks entering between the points of the prongs are directed into the slots, through which they are drawn by the action of the rollers $k$, which are turned toward each other by the motion of the axle B, while the ears, being too thick to pass through the slots, are broken off and retained upon the edges of the prongs. The stalks are therefore left upon the ground, while the ears rolling down the inclined upper edges of the forks enter between the toothed concave H and revolving cylinder I. These tear off the husk and separate the grains from the cob. As the mass of cobs, husks, and grain is delivered from the hinder edge of the concave it passes over the inclined surface of the riddle, which is put in motion from the toothed cylinder. The shelled grains fall through the spaces of the riddle into the bin beneath, while the cobs and husks are discharged over the hinder edge of the riddle at the back of the frame.

Cases occur where the cob is stronger than the stalk. In such cases I add a second set of gathering-forks to the machine. This additional set G, Fig. 2, (indicated by red lines,) is supported above the lower set and is parallel in direction and immediately above them.

I also use a second set of spring-rollers, $k'$, which are supported in suitable boxes above the second set of slots, and are driven similar to the first set by a transverse shaft, $o$, which is put in motion by cog-gearing from the axle B of the running wheels. By this arrangement those stalks which are broken at the lower slots are seized and drawn upward to the top of the machine, where they fall upon the ground, while the ears are retained by the under edges of the upper slots and fall upon the inclined edges of the lower ones, whence they are conducted to the shelling apparatus behind. In the machine represented at Figs. 4 and 5 the diverging portions of the prongs are retained, while the parallel portions are replaced by a set of rotating teeth, N, secured to a revolving cylinder, O, which is driven from the axle B of the running wheels. These teeth seize and strip the ears from the stalks, while the latter are firmly held between a set of horizontal gripping-wheels, P. The rims of the latter are formed of some flexible substance, which is forced outward by springs from the hub, so that as the cornstalks pass between them they grip them firmly, while at the same time the springs, by yielding, admit a greater or less quantity of stalks. These spring-rimmed wheels are driven by beveled gearing from a transverse shaft, $p$, beneath, which is also put in motion from the axle B of the machine, the speed of the several parts of this arrangement being such that the rims of the spring-wheels move about as fast as the machine moves over the ground. As the ears are stripped from the stalks they are thrown upon a series of inclined bars, $q$, down which they pass to the shelling apparatus, or into a box behind. It is evident that the rotating teeth of this machine are the equivalents of the parallel portions of the fixed forks of the machine first described, which is represented by Figs. 1, 2, and 3.

In the machine represented at Figs. 6 and 7 the parallel portions of the forks of the machine represented at Fig. 1 are replaced by a series of bars or plates, R, which are hinged at their hinder extremities to the frame of the machine. These bars are caused to turn up and down upon their pivots by means of a series of cams, S, which are secured to the axle B, and act upon wipers $r$, secured to the hinder extremities of the bars R. By the reciprocating motion thus imparted to them the bars strip the ears from the stalks with less danger of breaking the latter than there is when the stem of the ear is broken off by a steady pull. The stalks are conducted to the stripping-slots by diverging prongs $a$ $b$ and by a revolving reel, T, which is supported above the prongs and is driven from the axle B. The stripping of the ears from the stalks is facilitated by a pair of rollers, which are placed beneath the vibrating bars, and act in the same manner as the rollers described in the preceding machines.

The machine represented in the accompanying drawings at Figs. 1, 2, and 3 is constructed to act upon three rows of corn simultaneously; but the machine may be built to act upon any number of rows. This machine is also represented with fork-prongs separated by fixed spaces, so that they are only adapted to acting upon rows separated by a fixed interval; but it is evident to the skillful mechanic that the forks, together with those parts of the machine which act with them, may be made adjustable to fit the machine for acting upon fields of corn having rows separated by different intervals, or upon different varieties of corn.

The machine represented at Figs. 4 and 5 may be modified by substituting a cylinder carrying a series forks with parallel and diverging prongs in place of the parallel teeth N on the cylinder O and the stationary diverging prongs $a\ b$ on the frame. In this case the revolving prongs will effect the gathering of the corn without the aid of the stationary prongs of Figs. 1 and 6, or of the rollers for pulling the stalks between the prongs.

The frame of the machine may be made adjustable, so that the gathering-forks can be set at greater or less distances from the ground to adapt the machine to corn of varying size. The rollers for drawing the stalks through the forks may also have plain barrels, or they may be fluted or corrugated in any direction. They may also be either plain cylinders, or may be conical.

Cases may occur in which the ears will not pass freely toward the hinder part of the machine. This difficulty may be obviated by receiving the ears as fast as they are stripped off upon an endless apron, which will convey them to the hinder part of the machine. In some cases it may be deemed advisable to discharge the ears into the body of a wagon which is drawn along by the side of the corn-gatherer. This may be effected by an elevator, which may be made to receive the corn from the gathering-forks and to discharge it into the wagon-body. The corn may be likewise discharged into sacks or into cases on wheels, which should be attached to the machine in such manner that when one is filled it may be removed and its place supplied by an empty one.

The team may be made to walk either before the machine or behind it by changing the position of the tongue.

A husking and shelling apparatus of any approved form may also be substituted for the one I have described.

The machine may be constructed of such materials as the builder may see fit, and the various moving parts of it may be put in motion through the intervention of any suitable mechanical devices.

Having thus described my invention and various machines for carrying it into operation, I wish it to be understood that I do not limit myself merely to the various parts herein described when combined together in a single machine, as some of these parts may be used without the others. Neither do I limit myself to the precise combination of parts described in this specification, as portions of one machine may be used in connection with portions of the others, thus constituting new machines operating upon a common principle; but

What I claim as my invention, and desire to secure by Letters Patent, is—

1. The method, substantially as herein described, of separating the ears of Indian corn from the standing stalks on which they grow.

2. In combination with gathering-forks, apparatus for husking and shelling the corn, substantially as herein set forth, whereby the gathering, husking, and shelling of corn are performed at a single operation.

In testimony whereof I have hereunto subscribed my name.

WILLIAM WATSON.

Witnesses:
T. C. DONN,
P. H. WATSON.